July 24, 1962 W. E. GIFFORD ET AL 3,045,436
PNEUMATIC EXPANSION METHOD AND APPARATUS
Filed Dec. 28, 1959 2 Sheets-Sheet 1
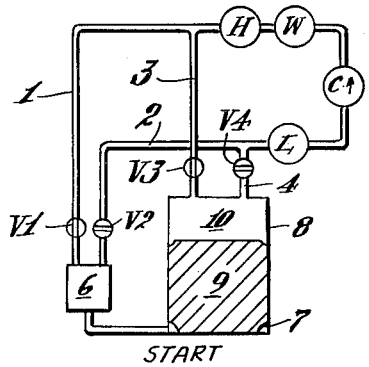
Fig. 1 START
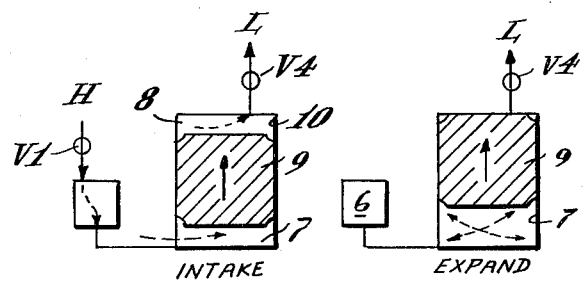
Fig. 2 INTAKE Fig. 3 EXPAND
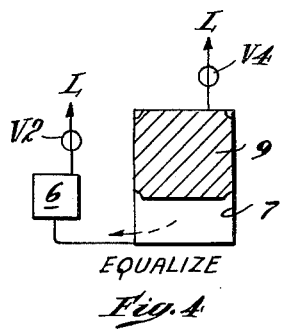
Fig. 4 EQUALIZE
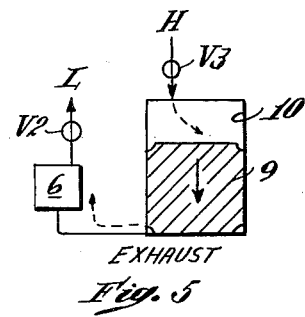
Fig. 5 EXHAUST
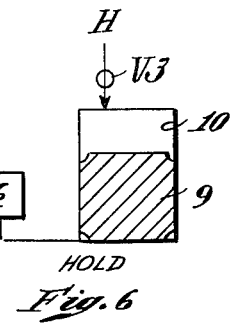
Fig. 6 HOLD
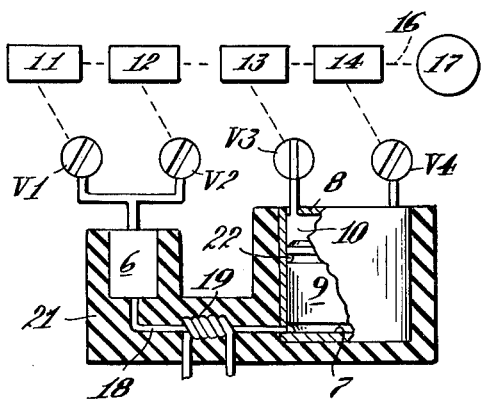
Fig. 7
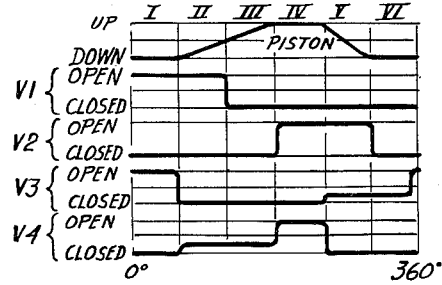
Fig. 8
INVENTORS
William E. Gifford
Howard O. McMahon
by Roberts, Cushman & Grover
ATT'YS INVENTORS
William E. Gifford
Howard O. McMahon
by Roberts, Cushman & Grover
ATT'YS

United States Patent Office 3,045,436
Patented July 24, 1962

3,045,436
PNEUMATIC EXPANSION METHOD AND APPARATUS
William E. Gifford and Howard O. McMahon, Lexington, Mass., assignors, by mesne assignments, to International Business Machines Corporation, New York, N.Y., a corporation of New York
Filed Dec. 28, 1959, Ser. No. 862,199
32 Claims. (Cl. 62—6)

This invention relates to a method and apparatus in which a working fluid is expanded and cooled to produce refrigeration and involves a novel way to control the expansion of the working fluid.

In the United States Patent No. 2,906,101 of Howard O. McMahon and William E. Gifford is described a refrigeration method in which a working fluid such as helium is supplied under pressure to an expansible chamber between a piston and cylinder. The piston is connected through a rod to a braked flywheel which controls the piston such that the piston holds the fluid in the chamber compressed and then the piston is allowed to move, thereby expanding the chamber and the fluid. On expansion the fluid is cooled and energy is delivered externally of the chamber in the form of mechanical energy absorbed by the flywheel brake.

An object of the present invention is to eliminate mechanical connections to the piston such as the piston rod, flywheel and brake, and to provide a new way of delivering energy given up by the expanding fluid.

According to the invention a refrigeration method comprises continuously compressing quantities of fluid, supplying a first quantity of fluid to an expansible chamber while applying a second quantity of compressed fluid so as to hold the chamber under pressure, and discontinuing the supply of compressed fluid thereby to release the pressure and permit the chamber to expand and cool the fluid therein. More particularly, the same source of compressed fluid is used to supply fluid into the chamber and to apply pressure externally of the chamber to hold is compressed.

Further according to the invention the fluid applied externally to hold the chamber compressed is thereby heated, and when the external pressure is released and the fluid in the chamber expands energy is removed in the form of heated fluid.

Still further according to the invention fluid refrigeration apparatus for use with relatively high and low pressure fluid sources comprises expansible chamber means, fluid control means for compressing and expanding the chamber, regenerator means connected to said chamber, and fluid input and fluid output means for each of said control means and regenerator, both fluid input means and both fluid output means being connected respectively to relatively high and low pressure fluid sources, whereby said chamber is held compressed by said control means while compressed fluid is supplied to said chamber through said regenerator, whereafter said control means effects expansion of the chamber and cooling of the fluid therein. Typically the fluid control means is a piston whose movement compresses or expands a chamber in a cylinder and which is supplied fluid through a fluid input valve and a high pressure line, and which exhausts the fluid through a fluid output valve and low pressure line.

For the purpose of illustration typical embodiments of the invention are shown in the accompanying drawing in which:

FIG. 1 is a schematic diagram of a fluid expansion system;

FIGS. 2 to 6 are diagrams showing successive steps in operation of the system;

FIG. 7 is a schematic diagram showing the apparatus used in the system of FIGS. 1 to 6;

FIG. 8 is a diagram showing the cycle of operation of the system; and

Figure 9:
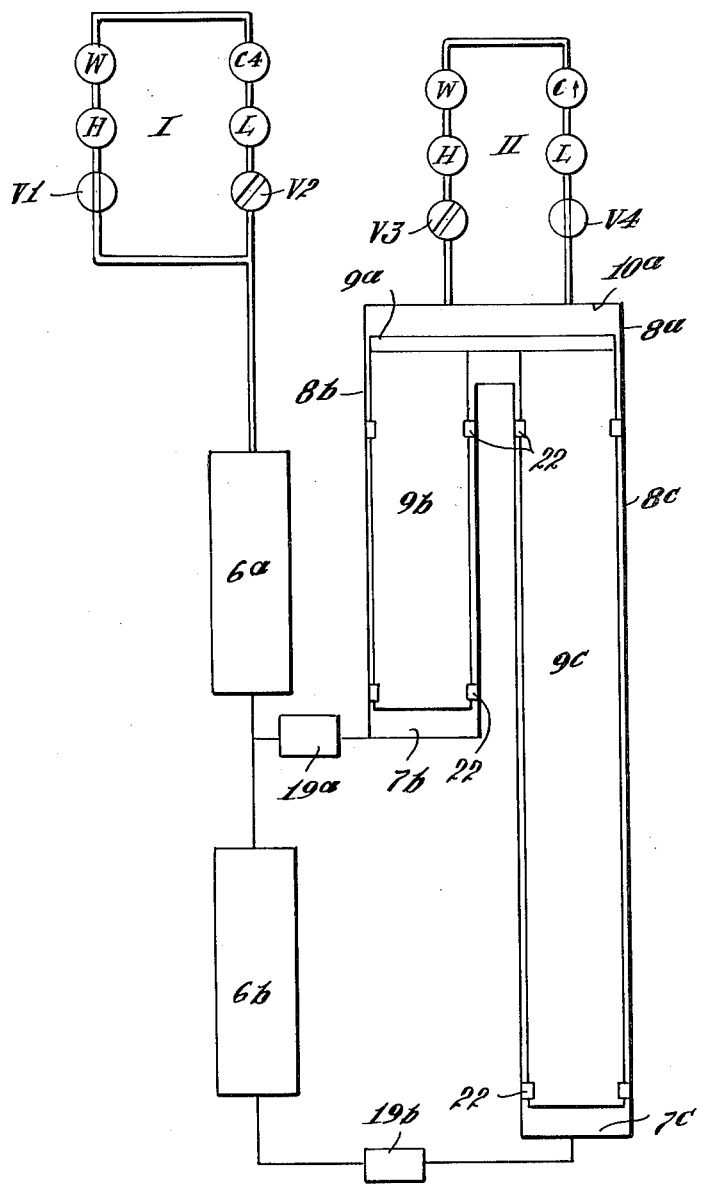
FIG. 9 is a schematic diagram showing a modification of the apparatus.

Shown in FIG. 1 is a fluid supply system comprising in part a low pressure ballast or fluid reservoir L, a compressor C, a cooler W and a high pressure ballast H. A refrigeration fluid such as hydrogen or helium is continuously drawn from the low pressure ballast L and compressed by the compressor C. The heat of compression is removed by the water cooler W and the highly compressed fluid is delivered to the high pressure ballast H at ambient temperature, usually about 300° K. A high pressure line 1 supplies the compressed fluid to a fluid inlet valve V1 connected through a regenerator 6 to an expansion chamber 7 formed by a cylinder 8 and a piston 9. The piston 9 acts as a fluid control device for collapsing and expanding the chamber 7 as well as forming the moving wall of the chamber. The piston and cylinder also form an upper chamber 10 connected to the high pressure line 1 through a valve V3 and by-pass line 3, and to the low pressure line 2 through a like valve V4 and by-pass line 4. If the chamber is formed by a bellows or other expansible structure, the piston may be located outside such structure.

As shown in FFIG. 7 the valves V1, V2, V3 and V4 respectively are operated by synchronized actuators 11, 12, 13 and 14 such as cams coupled by a linkage 16 to a motor 17. As will be described in detail, the valves are opened and closed by the actuators during a cycle in which the piston is raised from a down to an up position and then returned to down position. After a few cycles of operation a temperature gradient develops across the regenerator 6 as a result of cooling in the expansion chamber 7, the upper end nearest the valves V1 and V2 remaining close to ambient temperature, and the lower end approaching the low limit of the temperature in the expansion chamber. Therefore the regenerator 6 and cylinder 8, as well as a connecting line 18 and a heat exchanger 19, are covered by an insulating jacket 21 which extends at least to the upper end of the regenerator and cylinder. The valves all operate at ambient temperature.

The piston is preferably formed of a material having low thermal conductivity so that refrigeration loss from the expansion chamber to the upper chamber is minimized. It will be understood that in practice the piston is much longer than shown, e.g. six or seven times as long as its stroke, and provides a long thermal path. Near the top of the piston a packing ring 22 provides a loose seal between the piston and cylinder preventing fluid leakage between the upper and lower chambers. During operation the pressure differential between these chambers is kept low to eliminate the need for a tight seal and lubrication.

The operating cycle is as follows:

I. *Start (FIG. 1).*—Initially the piston is down and high pressure valve V1 is opened fully while valve V3 is already open to the high pressure line 1 compressing fluid in the regenerator 6, chamber 7 and the upper chamber 10. By way of example, the compressor may produce a pressure of 200 p.s.i. With the piston fully down there is negligible volume in the expansion chamber 7. However, there is a small volume in the regenerator 6 and a large volume of fluid in the upper chamber 10. These volumes are heated by the compression. The regenerator extracts the heat of compression of the fluid in it, while the fluid in the upper chamber remains heated.

II. *Intake (FIG. 2).*—The high pressure valve V3 is closed and the low pressure valve V4 is opened slightly to bleed a small amount of heated fluid to the low pressure line 2. The piston is slowly raised by the high pressure of the fluid supplied through the regenerator and compressed fluid is taken into the expansion chamber 7. The lower end of the regenerator and the chamber 7, having been cooled in previous cycles, cause the incoming fluid to be cooled and contract and to tend to lose pressure. But pressure is maintained by continued supply. Intake continues until chamber 7 is 50% to 70% expanded by upward movement of the piston.

III. *Expand (FIG. 3)*.—The high pressure valve V1 is then closed cutting off intake of fluid through the regenerator. Heated fluid continues to bleed slowly through the low pressure valve V4 allowing the piston to continue its upward stroke and allowing expansion of the cool, compressed fluid in the expansion chamber 7. This expansion results in further cooling of the cool, compressed fluid at the same time that heated fluid is substantially fully exhausted from the upper chamber to the low pressure line. That is, refrigeration in the expansion chamber 7 is accompanied by delivery of energy externally of the cylinder 8. Because the low pressure valve is opened only slightly it maintains a pressure differential between the upper chamber and the low pressure line so that the fluid in the upper chamber is under only a few pounds less pressure than fluid in the expansion chamber during this expansion stroke.

At the end of the expansion stroke the expansion chamber is filled with fluid whose temperature has been reduced by expansion of the chamber. Both chambers have been reduced in pressure proportionally to the extent of the expansion stroke but have not dropped to the pressure of the low pressure lines.

IV. *Equalize (FIG. 4)*.—Both low pressure valves V2 and V4 are opened fully permitting fluid in both chambers to drop to the pressure of the low pressure line 2 while the piston dwells in upper position. Valves V2 and V4 are suitably shaped to allow an appropriate rate of pressure drop in chamber 7. The upper chamber has been substantially exhausted of heated fluid and discharges a negligible volume. The expansion chamber, however, contains a substantial amount of fluid which has not been reduced to low pressure. This fluid expands and cools somewhat as it is released through the regenerator.

V. *Exhaust (FIG. 5)*.—Valve V4 is then closed and valve 3 is opened slightly to supply high pressure to the upper chamber and push the piston downward slowly with slight force. The cooled fluid in the refrigeration is exhausted through the regenerator. Because the exhausting fluid has been cooled during expansion below its initial temperature on entering the expansion chamber, it cools the regenerator below its temperature at the beginning of the cycle. In turn the fluid is warmed by the regenerator to slightly above ambient temperature when it enters the low pressure line.

VI. *Hold (FIG. 6)*.—The low pressure valve V2 is then closed and the high pressure valve V3 is opened fully so that the piston is held in downward position. The piston dwells in this position a short time. The apparatus is then in condition for the start of a new cycle.

The cycle is repeated, and in each cycle the regenerator, expansion chamber and exhaust fluid drop in temperature until an equilibrium is reached in which thermal losses through the insulation or the thermal load of the heat exchanger 19 equal the cooling effect of each cycle. When equilibrium is reached temperature gradient exists across the regenerator, the upper end of the regenerator being at or somewhat above the temperature of fluid in the high pressure line, and the lower end of the regenerator being near the temperature in the expansion chamber less the temperature drop across the exchanger.

In FIG. 8 is shown the relation between the stages I to VI of piston movement and the valves V1 to V4 during one cycle. The curves representing the opening and closing of the valves also represent the contours of the respective cams 11 to 14 actuating the valves. Briefly summarizing the cycle:

I. Valve V1 is opened relatively abruptly (valve V3 being open) to apply high pressure to both sides of the lowered piston;

II. Valve V3 is closed and valve V4 is opened only sufficiently to allow the piston to raise slowly as high pressure fluid flows into the expansion chamber 7 at constant pressure, additional fluid being supplied as the fluid cools and densifies in the expansion chamber;

III. Valve V1 is closed and valve V4, still opened only slightly, allows the fluid in the upper chamber 10 to bleed to the low pressure line as the fluid in the lower chamber 7 expands and cools;

IV. At the top of its stroke the piston dwells as low pressure valve V2 is opened to allow equalization of pressure on both sides of the piston;

V. Valve V4 is then closed, and the high pressure valve V3 is opened only sufficiently to displace the piston downwardly and exhaust the cooled gas from the expansion chamber through the regenerator at a slow, steady rate and at constant pressure;

VI. Valve V2 is closed and valve V3 is opened fully to hold the piston down, in position for the beginning of the next cycle.

The process and apparatus described above, when used with helium as the working fluid, is capable of achieving temperatures around 40° K. The amount of refrigeration will depend on the size of the piston involved, but very low temperatures may be obtained with pistons under one inch in diameter.

In FIG. 9 is shown a modification of the invention in which two separate closed fluid systems I and II are used to supply quantities of fluid respectively to the upper chamber 10a and lower chambers 7b and 7c of a multiple piston apparatus. Each separate system includes a low pressure ballast L, compressor C, cooler W and high pressure ballast H like those of FIGS. 1 to 7. Valves V1, V2, V3 and V4 are operated like those of FIGS. 1 to 7. The fluids in the two systems may be identical or different. For example, the first system I supplying the expansion chambers 7b and 7c may use helium, while the second system II may contain nitrogen, since the upper chamber 10a operates near or above room temperature. Use of nitrogen in the second system will not affect the refrigeration produced by the helium in the expansion chambers because the two fluids are supplied to different chambers, and, the pressure differential between chambers being kept low, there is little tendency for leakage past the pistons between lower and upper chambers. The two fluid systems may be used with the single piston apparatus of FIGS. 1 to 7.

The modified apparatus of FIG. 9 comprises a head cylinder 8a in which a head piston 9a reciprocates. Extending from the upper cylinder 8a are two smaller cylinders 8b and 8c in which the two previously mentioned pistons reciprocate, those pistons being connected to the head piston 9a. The head piston 9a forms with the head cylinder 8a the upper chamber 10a supplied by the second fluid system II. The two pistons 9b and 9c form the expansion chambers 7b and 7c within their respective cylinders 8b and 8c. The head and expansion chambers are isolated by seals 22.

Between valves V1 and V2 and the expansion chamber 7b is a first regenerator 6a. Between expansion chambers 7b and 7c is a second regenerator 6b. Fluid supplied through valve V1 passes through regenerator 6a to expansion chamber 7b and also through regenerator 6b to expansion chamber 7c. Fluid is also supplied through valve V3 and exhausted through valve V4 to the head chamber 10a to control expansion of the chambers 7b and 7c. The two quantities of fluid are supplied and exhausted by the process described with reference to FIGS. 1 to 8, and refrigeration is thereby produced in both expansion chambers. However, the temperature of the working fluid in chamber 7c is lower than that in chamber 7b for the reason that fluid supplied to chamber 7c has been cooled by both regenerators, as more fully explained in our United States Patent No. 2,906,101.

With two pistons and using helium in the first fluid system I it is possible to produce refrigeration at 20° K. in expansion chamber 7c. With three pistons temperatures as low as approximately 10° K. can be attained. Preferably refrigeration is extracted at the lower temperature by thermal load means 19b, however refrigeration can also be extracted from fluid cooled in chamber 7b by load means 19a.

In the described embodiments effective refrigeration is made possible by the careful maintenance of slow pressure changes and steady fluid flow, but particularly by the use of the working fluid not only for expansion cooling but also for operating the piston and for delivering energy at the time of expansion cooling. Maintenance of, at the most, a small pressure differential between opposite ends of the piston eliminates the need for tight seals and lubrication, thus reducing friction losses.

It should be understood that the present disclosure is illustrative only in that the invention comprises modifications and equivalents falling within the appended claims. For example the multiple piston apparatus of FIG. 9 may be operated with the single fluid supply system of FIGS. 1 to 8.

We claim:

1. A fluid refrigeration method which comprises continuously compressing quantities of fluid, cooling and beginning supply of a first quantity of compressed fluid to an expansible chamber while applying a second quantity of compressed fluid externally of the chamber to hold the chamber under pressure and substantially exhausted of fluid to allow the chamber to expand and admit said first quantity of fluid without substantial change in pressure, and discontinuing the supply of the first quantity of fluid while continuing release of said second quantity of fluid, thereby to permit the chamber and fluid therein to expand and cool the fluid.

2. The method according to claim 1 wherein the first and second quantities of fluid are supplied from the same compressed quantities.

3. The method according to claim 1 wherein the first and second quantities of fluid are supplied from different quantities of compressed fluid.

4. The method according to claim 3 wherein the different quantities of compressed fluid are chemically different.

5. A fluid refrigeration method which comprises continuously compressing the fluid, cooling and supplying the compressed fluid into an expansible chamber while simultaneously using the compressed fluid externally of the chamber to hold the chamber under pressure, discontinuing the supply of compressed fluid, and releasing the external pressure and thereby to permit the chamber and fluid therein to expand and cool the fluid.

6. A fluid refrigeration method which comprises continuously compressing the fluid, applying the compressed fluid to a volume of fluid external of an expansible chamber thereby to heat the volume of fluid and also to hold the chamber under pressure, cooling and supplying the compressed fluid to the chamber while partially releasing the heated fluid so as to permit the chamber to expand and receive fluid therein, discontinuing supply of fluid into the chamber, and further releasing the heated fluid to permit the chamber and fluid therein to expand and cool the fluid.

7. A fluid refrigeration method which comprises continuously compressing the fluid, cooling the fluid to remove the heat of compression, applying the compressed fluid to a volume of fluid external of an expansible chamber thereby to heat said volume of fluid and also to hold the chamber collapsed, supplying the compressed fluid to the chamber while partially releasing the heated fluid so as to permit the chamber to expand and receive compressed fluid therein while supply of fluid thereto is continued, discontinuing supply of fluid to the chamber, and further releasing the heated fluid to permit the chamber and fluid therein to expand and cool the fluid.

8. A fluid refrigeration cycle which comprises continuously drawing fluid from a low pressure supply thereof, compressing the fluid, cooling the fluid to remove the heat of compression and delivering the compressed fluid to a reservoir; applying compressed fluid from the reservoir to a volume of fluid external of an expansible chamber thereby to hold the chamber compressed and to heat said volume of fluid, supplying compressed fluid from the reservoir to the chamber while releasing part of said heated volume to the low pressure supply so as to permit the chamber to expand and receive fluid therein while the supply of fluid thereto is continued, discontinuing supply of fluid to the chamber, further releasing said heated volume of fluid to the low pressure supply thereby to permit the chamber and fluid therein to expand and cool the fluid, again applying fluid from the high pressure reservoir externally of the chamber to collapse the chamber and exhaust the cooled fluid therein to the low pressure supply.

9. A fluid refrigeration method which comprises continuously compressing the fluid, cooling and supplying the compressed fluid into an expansible chamber while applying the compressed fluid externally of the chamber to hold the chamber under pressure, discontinuing the supply and application of compressed fluid, thereby to permit the chamber and fluid therein to expand and cool the fluid, and again applying compressed fluid externally of the chamber thereby to exhaust the cooled fluid therefrom.

10. A fluid refrigeration method which comprises continuously compressing the fluid, cooling and supplying the compressed fluid into an expansible chamber while applying the compressed fluid externally of the chamber to hold the chamber under pressure, discontinuing the supply and application of compressed fluid, thereby to permit the chamber and fluid therein to expand and cool the fluid, and again applying compressed fluid externally of the chamber thereby to exhaust the cooled fluid therefrom and extracting refrigeration from the cooled fluid during exhaust.

11. A fluid refrigeration method which comprises continuously compressing the fluid, cooling and supplying the compressed fluid into an expansible chamber while simultaneously using the compressed fluid externally of the chamber to hold the chamber under pressure, discontinuing the supply of compressed fluid, and releasing the external pressure and thereby to permit the chamber and fluid therein to expand and cool the fluid, said release of external pressure being controlled to permit slow, steady isentropic cooling.

12. Fluid refrigeration apparatus for use with relatively high and low pressure fluid sources, comprising expansible chamber means, fluid control means for compressing and expanding the chamber, regenerator means connected to said chamber, and fluid input and fluid output means for each of said control means and regenerator, both fluid input means and both fluid output means being connected respectively to relatively high and low pressure fluid sources, whereby said chamber is held compressed by said control means while compressed fluid is supplied to said chamber through said regenerator, whereafter said control means effects expansion of the chamber and cooling of the fluid therein.

13. Fluid refrigeration apparatus for use with relatively high and low pressure fluid sources, comprising expansible chamber means, fluid control means for compressing and expanding the chamber, regenerator means connected to said chamber, fluid input and fluid output means for each of said control means and regenerator, both fluid input means and both fluid output means being connected respectively to relatively high and low pressure fluid sources, whereby said chamber is held compressed by said control means while compressed fluid is supplied to said chamber through said regenerator, whereafter said control means effects expansion of the chamber and cooling of the fluid therein, and a thermal load between said expansion chamber and regenerator means.

14. A closed fluid refrigeration system comprising a low pressure fluid reservoir, a compressor connected thereto for compressing the fluid, a high pressure reservoir, a fluid cooler interconnecting the compressor and high pressure reservoir, a cylinder, piston means forming an expansion chamber and a control chamber at opposite ends of the piston means, regenerator means connected to the expansion chamber, first valve means connected between the control chamber and the high and low pressure reservoirs, second valve means connected between the regenerator and the high and low pressure reservoirs, means synchronizing operation of said valve means to supply fluid to said expansion chamber, expand and cool fluid therein, and exhaust cooled fluid therefrom, and a thermal load between said expansion chamber and regenerator means for extracting refrigeration from the fluid during exhaust.

15. Fluid refrigeration apparatus comprising a low pressure fluid reservoir, a compressor connected thereto for compressing the fluid, a high pressure reservoir, a fluid cooler interconnecting the compressor and high pressure reservoir, expansible chamber means, fluid control means for compressing and expanding the chamber, regenerator means connected to said chamber, and fluid input and fluid output means for each of said control means and regenerator, both fluid input means and both fluid output means being connected respectively to said high and low pressure fluid reservoirs, whereby said chamber is held compressed when one of said fluid input means connects said high pressure reservoir to said control means while compressed fluid is supplied from the high pressure reservoir through the other fluid input means and said regenerator to said chamber, whereafter, when one of said fluid output means connects the control means with said low pressure reservoir while the fluid input means for said chamber discontinues supply to the chamber, said control means effects expansion of the chamber and cooling of the fluid therein.

16. Refrigeration apparatus for use with compressed fluid comprising means forming an expansible chamber, fluid actuated means to control expansion of the chamber, first valve means regulating fluid flow to and from said actuated means, second valve means regulating fluid flow to and from the chamber, and means synchronizing operation of said valve means so that the first valve means supplies compressed fluid to said actuated means to hold the chamber under pressure while said second valve means supplies compressed fluid into said chamber, said synchronizing means then causing the second valve means to discontinue supply and the first valve means to release pressure on the chamber and allow the chamber and the fluid therein to expand and cool the fluid.

17. Fluid refrigeration apparatus for use with relatively high and low pressure fluid sources, comprising expansible chamber means, fluid control means for compressing and expanding the chamber, regenerator means connected to said chamber, and fluid input and fluid output means for each of said control means and regenerator means, both fluid input means and both fluid output means being connected respectively to relatively high and low pressure fluid sources, whereby said chamber is held compressed by said control means while compressed fluid is supplied to said chamber through said regenerator, said control means effects expansion of the chamber and cooling of the fluid therein, and then said control means reapplies pressure to said chamber while said chamber is connected to said low pressure source to exhaust the cooled fluid from said chamber, and a thermal load connected between said chamber and regenerator means for extracting refrigeration from said cooled fluid during exhaust.

18. A closed fluid refrigeration system comprising a low pressure fluid reservoir, a compressor connected thereto for compressing the fluid, a high pressure reservoir, a fluid cooler interconnecting the compressor and high pressure reservoir, means forming an expansion chamber, means to control expansion of said chamber, a regenerator connected to the expansion chamber, first valve means connected between the control means and the high and low pressure reservoirs, second valve means connected between the regenerator and the high and low pressure reservoirs, and synchronizing means adapted to control said valve means in a cycle in which the first valve means supplies compressed fluid from the high pressure reservoir to the control means to hold the expansion chamber under pressure while the second valve means supplies compressed fluid from the high pressure reservoir to the expansion chamber, the first valve means then connecting the control means to the low pressure reservoir after the second valve means discontinues supply to the expansion chamber, whereby the expansion chamber and the fluid therein are permitted to expand and cool the fluid.

19. A closed fluid refrigeration system comprising a low pressure fluid reservoir, a compressor connected thereto for compressing the fluid, a high pressure reservoir, a fluid cooler interconnecting the compressor and high pressure reservoir, a cylinder, piston means forming with said cylinder an expansion chamber and a control chamber at opposite ends of the piston means, regenerator means connected to the expansion chamber, first valve means connected between the control chamber and the high and low pressure reservoirs, second valve means connected between the regenerator and the high and low pressure reservoirs, and synchronizing means adapted to control said valve means in a cycle in which the first valve means supplies compressed fluid from the high pressure reservoir to the control chamber to hold the expansion chamber under pressure while the second valve means supplies compressed fluid from the high pressure reservoir to the expansion chamber, the first valve means then connecting the control chamber to the low pressure reservoir after the second valve means discontinues supply to the expansion chamber, whereby the expansion chamber and the fluid therein are permitted to expand and cool the fluid.

20. A closed fluid refrigeration system comprising a low pressure fluid reservoir, a compressor connected thereto for compressing the fluid, a high pressure reservoir, a fluid cooler interconnecting the compressor and high pressure reservoir, a cylinder, piston means forming with said cylinder an expansion chamber and a control chamber at opposite ends of the piston means, regenerator means connected to the expansion chamber, first valve means connected between the control chamber and the high and low pressure reservoirs, second valve means connected between the regenerator and the high and low pressure reservoirs, and synchronizing means adapted to control said valve means in a cycle in which the first valve means supplies compressed fluid from the high pressure reservoir to the control chamber to hold the expansion chamber under pressure while the second valve means supplies compressed fluid from the high pressure reservoir to the expansion chamber, the first valve means then connecting the control chamber to the low pressure reservoir after the second valve means discontinues, supply to the expansion chamber, whereby the expansion chamber and the fluid therein are permitted to expand and cool the fluid, and the first valve means thereafter connecting the control chamber to the high pressure reservoir while the second valve means connects the regenerator means to the low pressure reservoir thereby to exhaust the cooled fluid to the regenerator.

21. A closed fluid refrigeration system comprising a low pressure fluid reservoir, a compressor connected thereto for compressing the fluid, a high pressure reservoir, a fluid cooler interconnecting the compressor and high pressure reservoir, a cylinder, piston means forming with said cylinder an expansion chamber and a control chamber at opposite ends of the piston means, regenerator means connected to the expansion chamber, first valve means connected between the control chamber and the high and low pressure reservoirs, second valve means connected between the regenerator and the high and low pressure reservoirs, synchronizing means adapted to control said valve means in a cycle in which the first valve means supplies compressed fluid from the high pressure reservoir to the control chamber to hold the expansion chamber under pressure while the second valve means supplies compressed fluid from the high pressure reservoir to the expansion chamber, the first valve means then connecting the control chamber to the low pressure reservoir after the second valve means discontinues supply to the expansion chamber, whereby the expansion chamber and the fluid therein are permitted to expand and cool the fluid, and the first valve means thereafter connecting the control chamber to the high pressure reservoir while the second valve means connects the regenerator means to the low pressure reservoir thereby to exhaust the cooled fluid to the regenerator, and a thermal load between said expansion chamber and regenerator means for extracting refrigeration from the fluid during exhaust.

22. Fluid refrigeration apparatus comprising two fluid supply systems each including a low pressure fluid reservoir, a compressor connected thereto for compressing the fluid, a high pressure reservoir, and a fluid cooler interconnecting the compressor and high pressure reservoir; a cylinder, piston means forming an expansion chamber and a control chamber at opposite ends of the piston means, regenerator means connected to the expansion chamber, first valve means connected between the control chamber and the high and low pressure reservoirs of one fluid supply system, second valve means connected between the regenerator and the high and low pressure reservoirs of the other fluid supply system, and means synchronizing operation of said valve means to supply fluid to said expansion chamber, expand and cool fluid therein, and exhaust cooled fluid therefrom.

23. Fluid refrigeration apparatus comprising two fluid supply systems each including a low pressure reservoir, a compressor connected thereto for compressing the fluid, a high pressure reservoir, and a fluid cooler interconnecting the compressor and high pressure reservoir; expansible chamber means, fluid control means for compressing and expanding the chamber, regenerator means connected to said chamber, first fluid input and output means for interconnecting the control means with one of said fluid supply systems, and second fluid input and output means interconnecting said regenerator and the other of said fluid supply systems, whereby said chamber is held compressed by said control means by supply of compressed fluid from one system, while compressed fluid is supplied to said chamber through said regenerator, whereafter said control means effects expansion of the chamber and cooling of fluid therein.

24. Fluid refrigeration apparatus comprising expansible chamber means, first means to supply a first quantity of compressed fluid to said chamber, separate means to apply a second quantity of compressed fluid externally of the chamber to hold the chamber compressed, and control means coordinating the first and separate means so as to discontinue supply and application of the respective quantities of compressed fluid, thereby to permit the chamber and fluid therein to expand and cool the fluid.

25. Fluid refrigeration apparatus comprising expansible chamber means, first means to supply a first quantity of compressed fluid to said chamber, separate means to apply a second quantity of compressed fluid externally of the chamber to hold the chamber compressed, and control means coordinating the first and separate means so as to discontinue supply and application of the respective quantities of compressed fluid, thereby to permit the chamber and fluid therein to expand and cool the fluid, said control means being adapted to cause said first means to discontinue supply of said first quantity of fluid and cause said separate means independently to discontinue application of said second quantity of fluid.

26. Fluid refrigeration apparatus according to claim 24 characterized by a common source of fluid connected to said first and separate means.

27. Fluid refrigeration apparatus according to claim 24 characterized by separate sources of fluid for said first and separate means.

28. Fluid refrigeration apparatus accordng to claim 27 wherein said separate sources contain chemically different fluids.

29. Fluid refrigeration apparatus according to claim 24 wherein said expansible chamber has a movable wall adjacent a space external of the chamber, and said separate means applies said second quantity of fluid to said space thereby to heat fluid in said space.

30. A fluid expansion method which comprises cooling and supplying a first quantity of compressed fluid externally of an expansible space to hold the space under pressure, supplying a second quantity of compressed fluid into the space, thereby to heat the first fluid, independently varying the pressures of the respective quantities of fluid to cause the space to expand and cool the second quantity of fluid therein while displacing the first, heated quantity of fluid, thereby to deliver thermal energy externally of the space.

31. A fluid refrigeration method which comprises continuously compressing and cooling quantities of working fluid, applying a quantity of compressed control fluid externally of an expansible chamber thereby to contract the chamber and exhaust substantially all fluid therefrom, supplying working fluid to the chamber to raise the pressure in the chamber to the pressure of the working fluid with negligible heating of fluid in the chamber, gradually releasing the external control fluid to a lower pressure space to allow the chamber to expand and admit working fluid therein without substantial pressure change, and discontinuing supply of working fluid during expansion of the chamber so that on continued release of the control fluid the chamber and working fluid therein expand with cooling of the working fluid, the cooled working fluid being displaced from the chamber by again applying compressed fluid externally of the chamber.

32. The fluid refrigeration method according to claim 31 characterized in that said control fluid is heated during application externally of said chamber and the aforesaid continued release of the control fluid is accompanied by release of the heat energy of said control fluid.

References Cited in the file of this patent

UNITED STATES PATENTS

| | | |
|---|---|---|
| 1,730,580 | Lundgaard | Oct. 8, 1929 |
| 2,047,057 | Brown | July 7, 1936 |
| 2,127,286 | Bush | Aug. 16, 1938 |
| 2,567,454 | Raconis | Sept. 11, 1951 |
| 2,657,552 | Jonkers | Nov. 3, 1953 |
| 2,772,543 | Berry | Dec. 4, 1956 |
| 2,813,398 | Wilcox | Nov. 19, 1957 |
| 2,914,924 | Murphy | Dec. 1, 1959 |
| 2,961,476 | Maslin | Nov. 22, 1960 |

FOREIGN PATENTS

| | | |
|---|---|---|
| 120,711 | Japan | Mar. 15, 1937 |

UNITED STATES PATENT OFFICE
CERTIFICATE OF CORRECTION

Patent No. 3,045,436　　　　　　　　　　　　　　　　July 24, 1962

William E. Gifford et al.

It is hereby certified that error appears in the above numbered patent requiring correction and that the said Letters Patent should read as corrected below.

Column 5, line 38, after "fluid" insert -- , gradually releasing the second quantity of fluid --.

Signed and sealed this 13th day of November 1962.

(SEAL)
Attest:

ERNEST W. SWIDER
Attesting Officer

DAVID L. LADD
Commissioner of Patents